US006861946B2

(12) United States Patent
Verplaetse et al.

(10) Patent No.: US 6,861,946 B2
(45) Date of Patent: Mar. 1, 2005

(54) MOTION-BASED INPUT SYSTEM FOR HANDHELD DEVICES

(75) Inventors: Christopher Verplaetse, Somerville, MA (US); W. David Lee, West Newton, MA (US); Thomas P. Evans, Watertown, MA (US); Jerry Nicholas Laneman, Quincy, MA (US)

(73) Assignee: Caveo Technology LLC., West Newton, MA (US)

(*) Notice: Subject to any disclaimer, the term of this patent is extended or adjusted under 35 U.S.C. 154(b) by 315 days.

(21) Appl. No.: 10/132,636

(22) Filed: Apr. 25, 2002

(65) Prior Publication Data

US 2002/0167699 A1 Nov. 14, 2002

Related U.S. Application Data

(63) Continuation-in-part of application No. 09/773,165, filed on Jan. 31, 2001, now Pat. No. 6,721,738, and a continuation-in-part of application No. 09/572,801, filed on May 17, 2000.
(60) Provisional application No. 60/286,860, filed on Apr. 26, 2001.

(51) Int. Cl.[7] ............................................... H04B 3/36
(52) U.S. Cl. ................. 340/407.2; 340/407.1; 340/315
(58) Field of Search ..................... 340/429, 568.1, 340/309.07, 309.09, 315, 323, 324, 407.1, 407.2; 345/173, 810

(56) References Cited

U.S. PATENT DOCUMENTS

| | | | | |
|---|---|---|---|---|
| 5,341,133 A | * | 8/1994 | Savoy et al. | 341/22 |
| 5,650,597 A | * | 7/1997 | Redmayne | 178/18.06 |
| 6,346,935 B1 | * | 2/2002 | Nakajima et al. | 345/173 |
| 6,369,794 B1 | * | 4/2002 | Sakurai et al. | 345/156 |
| 6,424,338 B1 | * | 7/2002 | Anderson | 345/173 |
| 6,430,295 B1 | * | 8/2002 | Handel et al. | 381/94.7 |
| 6,570,078 B2 | * | 5/2003 | Ludwig | 84/600 |

* cited by examiner

*Primary Examiner*—Van T. Trieu
(74) *Attorney, Agent, or Firm*—Iandioria & Teska; Marc Vivenzio (57) ABSTRACT

A motion-based input system including a motion sensor coupled to a device. The motion sensor provides a motion signal corresponding to the movement of the device. The system further includes a processor responsive to the motion signal and configured to distinguish between a tap command and a position command and provides, in response to a tap command, one or more actions, and in response to a position command, one or more different actions to control and operate the device.

18 Claims, 10 Drawing Sheets

MOTION-BASED INPUT SYSTEM FOR HANDHELD DEVICES

RELATED APPLICATIONS

This application claims as a continuation-in-part of U.S. utility application Ser. No. 09/572,801 filed May 17, 2000 is pending; Ser. No. 09/773,165 filed Jan. 31, 2001 now is U.S. Pat. No. 6,721,738; and Provisional Application No. 60/286,860 filed Apr. 26, 2001. All of these applications are incorporated by reference herein.

FIELD OF THE INVENTION

This invention relates to a motion-based input system and more particularly, to a motion-based input system for use with electronic devices.

BACKGROUND OF THE INVENTION

Modem electronic devices are become increasingly smaller in size. There are now personal data assistants (PDAs), handheld personal computers, cellular telephones, televisions, pagers, and computerized Rolodexes which fit in the palm of the hand. Typical prior art devices employ a mouse to position a pointer over an icon, and a "double click" is required to select the desired program associated with the icon. Other prior art devices use a combination of stylus and/or an "enter" key or button to select a desired program or to perform other actions. Other prior art devices employ a combination of position commands (e.g., tilting) to move the cursor and an "enter" key to select and activate the desired program. However, as these devices get increasingly smaller and the screensize requirements get relatively larger, traditional input buttons, enter keys, keypads and pointing devices are becoming more and more difficult for users to use and for manufacturers to incorporate into the devices.

One attempt to eliminate the need for keys, keypads and pointing devices is found in U.S. Pat. No. 6,347,290, herein incorporated in its entirety by this reference. This proposed motion-based input system, however, actually complicates the control and operation of the device by requiring a combination of different position commands (e.g., a particular orientation of the hand) and gesture commands (e.g., a time varying position expressed as a unique pattern of movement over an interval of time) to control and operate the device. Further, the apparatus and method as disclosed in the '290 patent requires the cumbersome task of inputting the various gesture commands into the system, storing the commands in a database, and memorizing them. Moreover, the gesture commands are typically complex patterns of movement which require physical dexterity of the hand.

Such a device is cumbersome and complicated because it requires both a position command and a gesture command to control and operate the device and requires the user to memorize each of the various gesture motions associated with the commands stored in the database. Moreover, because the gesture commands require dexterity of the hand, operation of this device is difficult and/or impossible for handicapped persons with limited hand motion.

In addition, application of the device and method disclosed in the '290 patent to mice technology would require lifting and tilting of the mouse to position the pointer (i.e. "point") over the desired icon, then performing a gesture command to activate the program associated with the icon (i.e. "click"). Clearly, this is an inefficient and cumbersome way to operate a mouse.

Other motion detection systems, such as those disclosed in U.S. Pat. Nos. 5,477,236 and 5,910,797, also incorporated herein in their entirety by this reference, suffer from the same or similar problems.

SUMMARY OF THE INVENTION

It is therefore an object of this invention to provide an improved motion-based input system.

It is a further object of this invention to provide such a motion-based input system which can be made to perform a combination of one or more actions or commands to control and operate a device by simply moving and tapping the device.

It is a further object of this invention to provide such a motion-based input system which eliminates the need for complicated gesture commands.

It is a further object of this invention to provide such a motion-based input system which is simple and easy to operate.

It is a further object of this invention to provide such a motion-based input system which can be used by persons with limited hand dexterity.

It is a further object of this invention to provide such a motion-based input system which eliminates the need for buttons for performing select and execute actions on handheld devices.

This invention results from the realization that a truly innovative motion-based input system which is simple and easy to operate requires only a tap on a device for one type of action (e.g., "enter") and motion of the device for a different action (e.g., cursor movement) or a combination of motions and taps in order to completely control and operate the device.

This invention features a motion-based input system comprising a motion sensor coupled to a device, the motion sensor providing a motion signal corresponding to the movement of the device, and a processor responsive to the motion signal and configured to distinguish between a tap command and a position command and to provide, in response to a tap command, one or more actions, and in response to a position command, one or more different actions to control and operate the device.

In one embodiment of this invention, the processor detects a tap command by computing the power spectral density of the motion signal and comparing the energy level of the computed power spectral density of the motion signal with a predetermined threshold energy level for a predetermined threshold frequency range. Ideally, the predetermined threshold levels are configurable to adjust the sensitivity of the tap detected by the processor. In one preferred embodiment, the predetermined threshold frequency detected by the processor is greater than or equal to 5 Hz. In one example, the predetermined threshold levels are stored in a memory. Preferably, the processor of the motion-based input system of this invention is a microprocessor.

In one design, the motion-based input system of this invention may further include an interface between the processor an operating system resident on the device. In a preferred embodiment, the motion-based input system further includes controlling software to control and operate the device based on the processor actions. Ideally, the motion sensor of the motion-based input system of this invention is an accelerometer and is coupled to an electronic device.

In one preferred design of this invention, the controlling software is programmed to display a graphical representation which indicates the direction of a current or a proposed position command. In one example, a continuous input mode provides continuous cursor or pointer movement in the direction of the current position command. Typically, the rate of cursor or pointer movement provided by the continuous input mode is proportional to the magnitude of the position command. Preferably, the controlling software may be programmed to display a graphical representation to indicate the direction of the continuous cursor or pointer movement.

In one preferred embodiment if this invention, a stepped input mode indicates the direction of a proposed position command and moves the cursor or pointer in the direction of the proposed position command in response to a tap command. Ideally, the controlling software is programmed to display a graphical representation to indicate the direction of the proposed position command.

In one design, the processor of the motion-based input system of this invention is configured to select a continuous input mode or a stepped input mode depending on the active software application.

This invention also features a motion-based input system comprising a motion sensor coupled to a device, the motion sensor providing a motion signal corresponding to the movement of the device, and a processor, responsive to the motion signal and configured to detect a tap command, and provide, in response to the tap command, one or more actions to operate and control the device.

In one example, the processor is responsive to the motion signal and may be configured to detect an impulse command, and provide, in response to the impulse command, one or more actions to control and operate the device. In other designs of this invention, the processor responsive to the motion signal may be configured to distinguish between a tap command and a tilt command and to provide, in response to the tap command one or more actions and in response to the tilt command, one or more different actions to control and operate the device.

This invention further features a motion-based input system comprising a motion sensor coupled to a device, the motion sensor providing a series of motion signals corresponding to movements of the device, and a processor, responsive to the series of motion signals, configured to detect a series of tap commands, and to provide, in response to the series of tap commands, one or more actions to operate and control the device.

In one example, the processor responsive to the motion signals may be configured to distinguish between a series of tap commands and a series of position commands on the device, and to provide in response to the series of tap commands, one or more actions, and in response to the series of position commands, one or more different actions to operate and control the device.

This invention further features a motion-based input system comprising motion sensing means coupled to a device for sensing motion and providing a motion signal corresponding to the movement of the device, and processing means responsive to the motion signal and configured to distinguish between tap commands and position commands and to provide, in response to the tap commands one or more actions and in response to the position commands one or more different actions to control and operate the device.

This invention also features a method for processing input commands for a device. The method includes detecting a motion signal corresponding to movement of the device, analyzing the motion signal to distinguish between a tap command and a position command, and providing, in response to a tap command, one or more actions and providing in response to a position command, one or more different action, to control and operate the device.

In one design, the motion-based input system of this invention typically includes a motion sensor coupled to a device, the motion sensor providing a motion signal corresponding to the movement of the device, and a first action or series of actions associated with a tap on the device, a second action or series of actions associated with other movement of the device, a processor responsive to the motion signal and configured to distinguish between a tap on the device and other movement of the device; and to provide, in response to a tap, said first action or series of actions and in response to the other movement, said second action or series of actions to control and operate the device.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

As explained in the Background section above, prior art motion-based input system 10, FIG. 1 as employed in handheld electronic device 12 such as a PDA, requires a combination of position commands (which relate to a particular angular orientation of electronic device 12) and gesture commands (time varying positions expressed as a unique pattern of movement in an interval of time) to control and operate electronic device 12. See U.S. Pat. No. 6,347, 290. As shown in FIG. 1A, icon 18 on screen 16 of electronic device 12 is not highlighted or selected. In order to select the desired program associated with icon 18 a user typically performs a position command by tilting electronic device 12, as shown in FIG. 1B to highlight or focus on icon 18. After returning electronic device 12 to its original position as shown in FIG. 1C, prior art motion-based input system 10 requires a gesture command to invoke the "enter" command and to select the desired program associated with icon 18. This gesture command is a time varying position expressed by a unique memorized pattern of movement, such as the somewhat cumbersome pattern between FIGS. 1D and 1E over a specific interval of time to activate the selected program associated with icon 18, such as calendar program 20, FIG. 1F. Moreover, prior art motion-based input system 10 requires a user to first input all the user's gesture commands into the system, store the various gesture commands associated with the unique patterns of movements in a database, and then memorize the patterns of movements associated with the user's selected gesture commands.

Thus, system 10 suffers from several distinct disadvantages. First, the device is cumbersome and complicated to operate because it requires both position commands to perform selections and gesture commands to enter or activate the selection. Second, system 10 requires the user to input and memorize the patterns of movements associated with chosen gesture commands stored in a database. Third, as shown in the example above, prior art motion-based input system 10 employs gesture commands which require hand dexterity, and therefore system 10 is not useful by handicapped persons with limited hand dexterity.

In sharp contrast, motion-based input system 50, FIG. 2 of the subject invention is much easier to use. System 50 includes a motion sensor (not shown in FIG. 2) coupled to (e.g., directly within, on, or indirectly attached to) device 54, such as a PDA, a hand held computer, or any other small handheld electronic or other device. The motion sensor provides a motion signal corresponding to movement of device 54. A processor (also not shown in FIG. 2) is responsive to the motion signal and is configured to distinguish between a tap on device 54 and other motion of device 54 and to provide, in response to a tap, one or more actions or commands (for example an "enter" command), and, in response to other motions (e.g., tilts, rotational motions, and/or translational motions), one or more different action or commands (e.g., cursor movement) to fully control and easily operate device 54. Thus, there are tap commands and motion commands. Because motion-based input system 50 is designed and configured to respond to tap commands as well as motion commands, a user, in one example, need only tilt device 54 to select a desired action or position command, then simply tap the device 54 to "enter" or activate the selected action. The result is a motion-based input system which is simple and easy to operate, which eliminates the need to memorize patterns of movement (e.g., gesture commands) to select commands stored in a database, and a unique system can be more easily used by persons with limited hand dexterity.

Figure 1A:
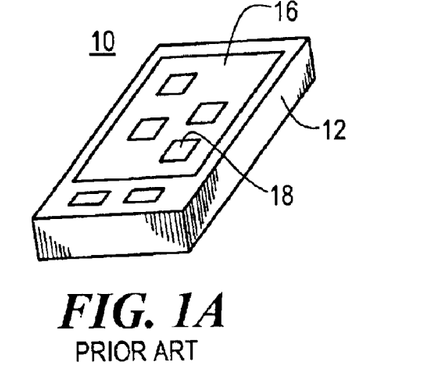
FIGS. 1A–1F are schematic three-dimensional views of a typical prior art motion based input system employed in a PDA.
Figure 1B:
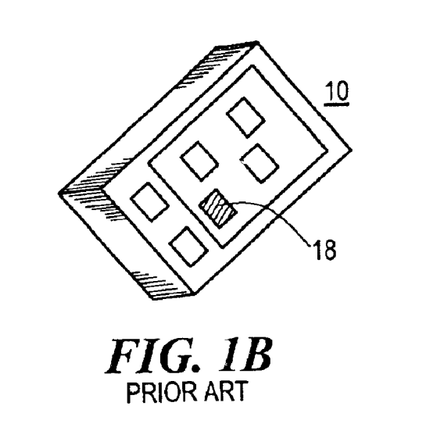
Figure 1C:
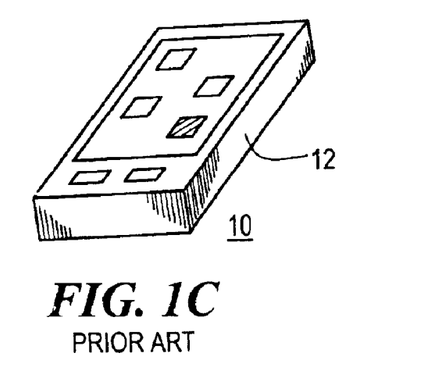
Figure 1D:
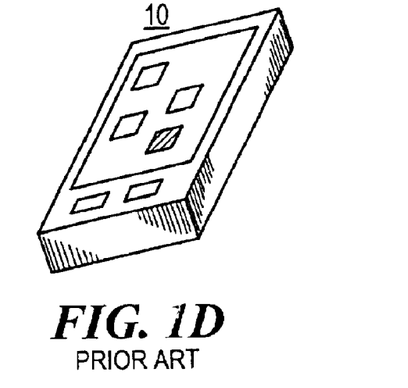
Figure 1E:
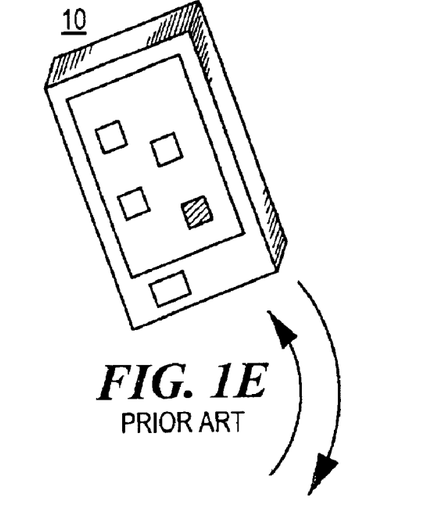
Figure 1F:
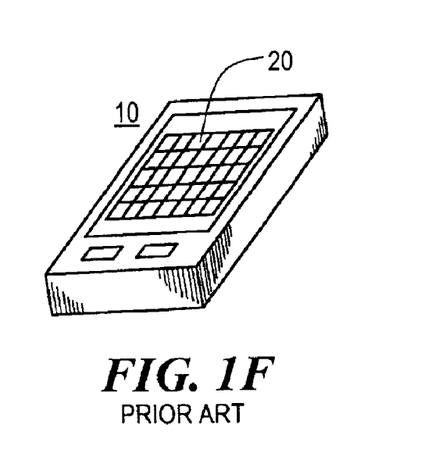
Figure 2A:
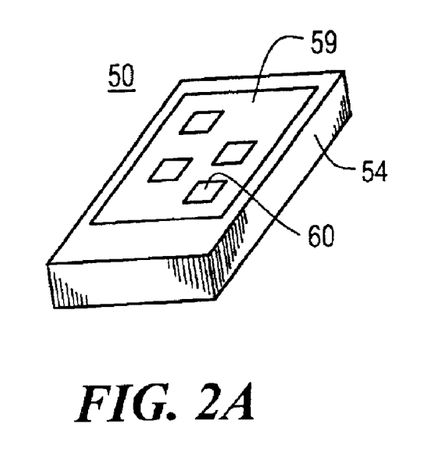
FIGS. 2A–2D are schematic three-dimensional views showing one example of the motion based input system of the subject invention also employed in a PDA.
Figure 2B:
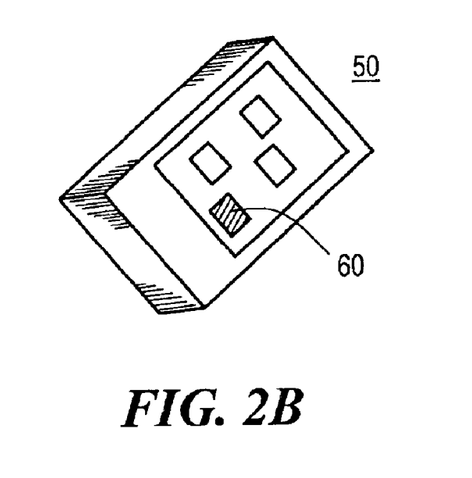
Figure 2C:
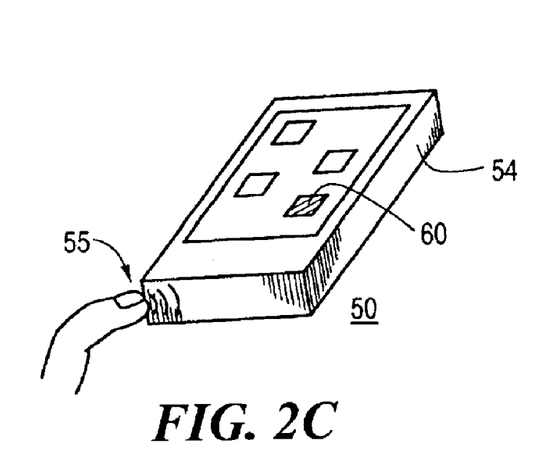
Figure 2D:
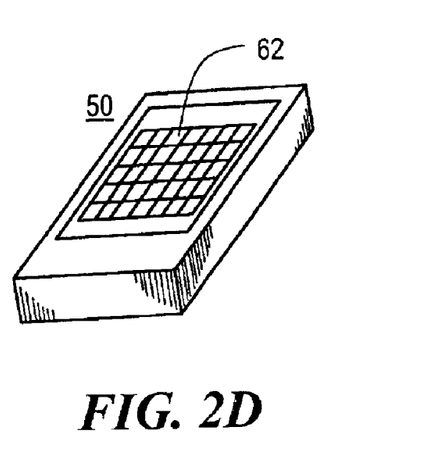

For example, in one embodiment of this invention as shown in FIGS. 2A–2D, a user can highlight or focus on icon 60 located on screen 59 of device 54 to select the particular application associated with icon 60 (such as a calendar program, or any other of the vast array of software programs available on hand held electronic devices) by tilting device 54 down to the right as shown in FIG. 2B. The motion sensor detects this motion of device 54 and provides a motion signal to the processor which responds by providing the appropriate commands to focus or highlight icon 60, as shown by icon 60 now being highlighted. Once icon 60 is focused or highlighted, the user simply taps electronic device 54, as shown at 55, FIG. 2C. The uniquely configured processor, responsive to the motion signal output by the sensor, detects the tap command and provides the appropriate actions to activate, in this example, calendar program 62, FIG. 2D, that is, an "enter" command is invoked, but without an enter button, mouse click, or gesture command.

Because the robust design of the motion-based input system of this invention detects a tap on device 54 and in response to the tap provides one or more actions to control and operate a device 54, a vast array of actions based on a simple tap or a series of taps can be invoked on a wide variety of electronic and even other devices.

Figure 3A:
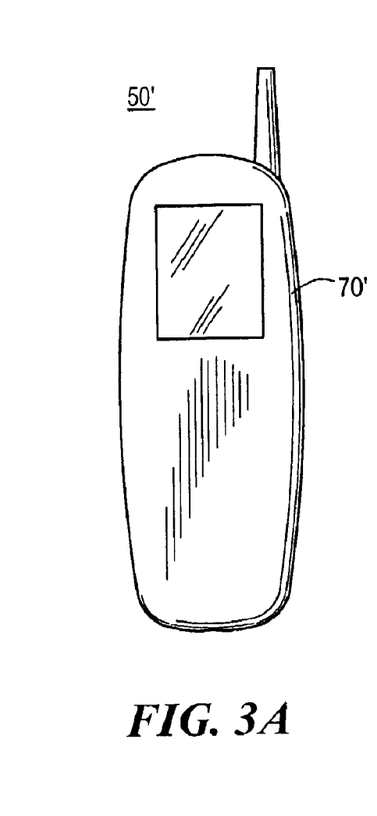
FIGS. 3A–3E are schematic three-dimensional views of another example of the motion based input system of this invention employed in a cellular telephone.
Figure 3B:
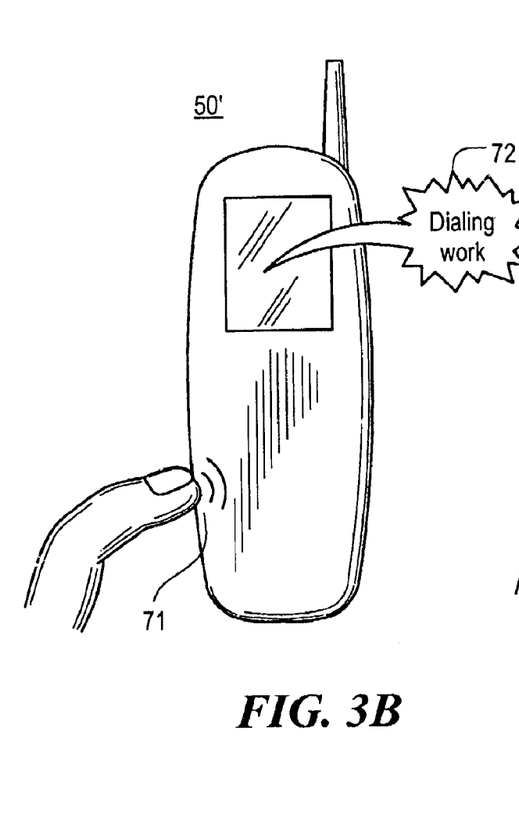
Figure 3C:
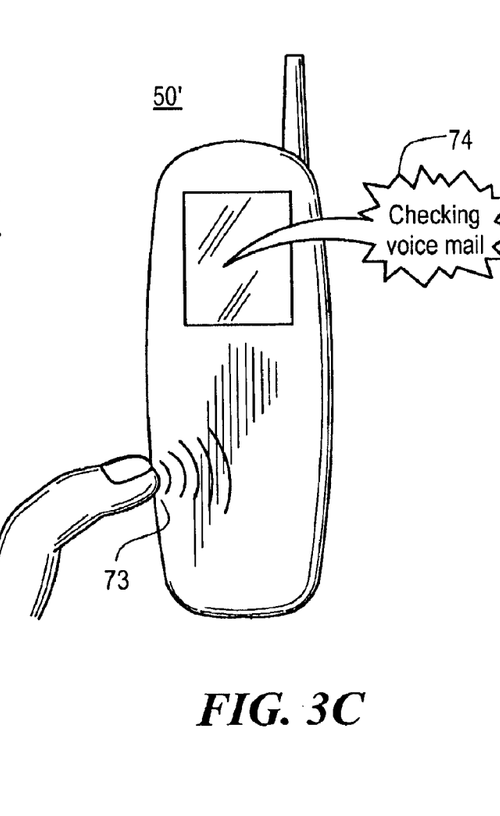
Figure 3D:
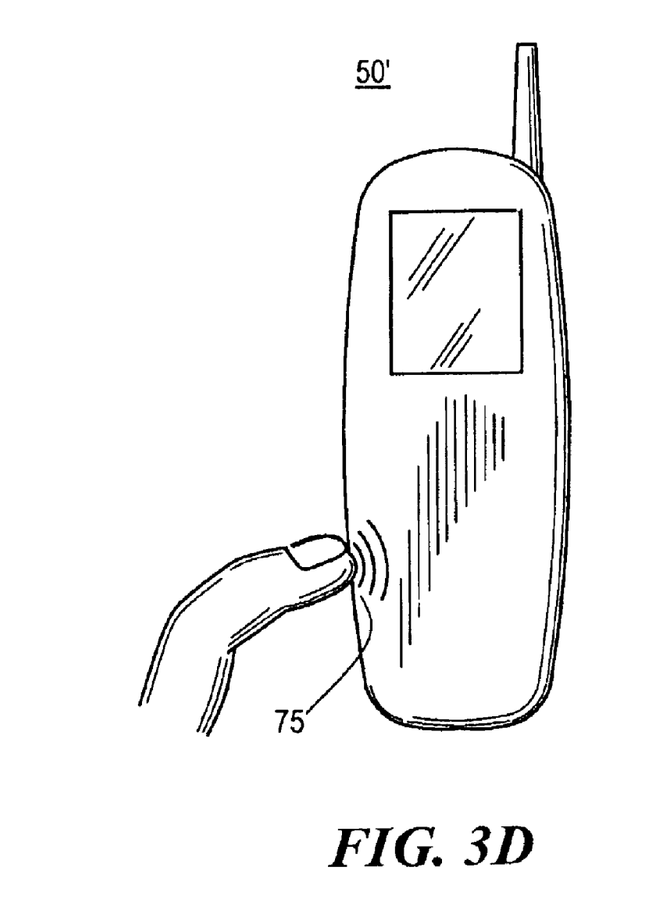
Figure 3E:
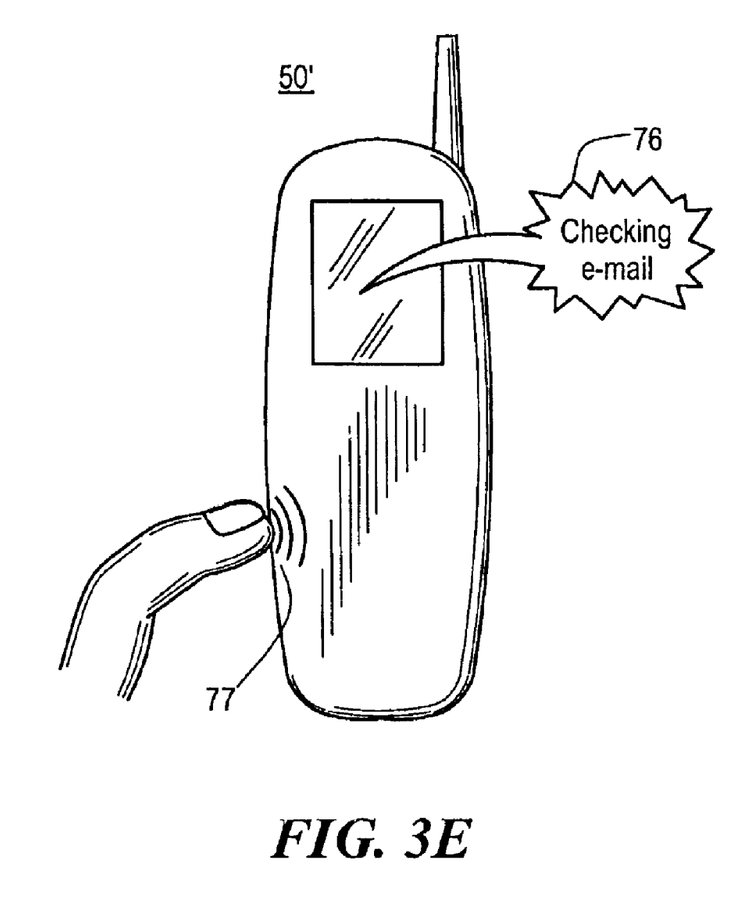

For example, in another embodiment of the subject invention, motion-based input system 50', FIG. 3A also includes a motion sensor coupled to electronic device 70, here a cellular telephone. The motion sensor provides a motion signal corresponding to movement of electronic device 70 and the processor detects a tap command as shown at 71, FIG. 313 and provides, in response to the tap command, action 72 which causes the cellular phone to dial the user's workplace. In another example, the processor detects a different tap command, for example a tap with more intensity, as shown at 73 in FIG. 3C and provides, in response to the tap command, action 74, which invokes the wireless phone to check a user's voice mail. Alternatively, the processor of motion-based input system 50' may be configured to detect a series of tap commands, shown at 75 in FIG. 3D and at 77 in FIG. 3E, and respond to the series of tap commands by providing, in this example, action 76 which causes the cellular telephone to dial and check a user's e-mail.

The result is a motion-based input system which provides the ability to perform a wide range of actions or commands based on a simple tap or series of taps on the device without the need for buttons, a mouse, a keyboard, and without the need to perform gesture commands, to store the gesture commands in a database, or to memorize the gesture commands. Moreover, any device which employs the motion based input system of this invention can be easily used by persons having limited hand dexterity.

Figure 4:
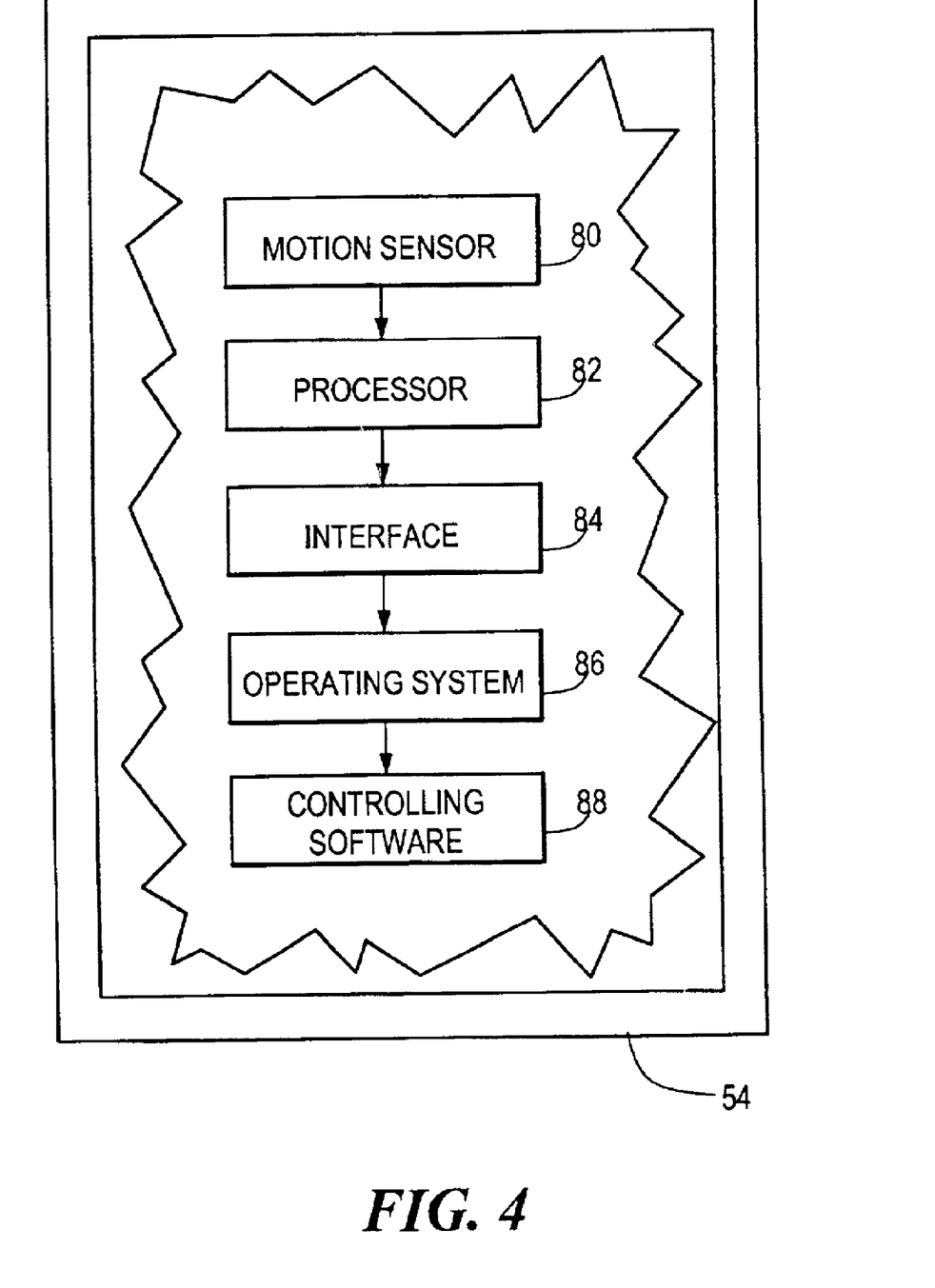
FIG. 4 is a partially broken away schematic view showing the primary components associated with the motion based input system of this invention when employed in a PDA.

As shown in detail in FIG. 4, motion-based input system 50 of this invention typically includes motion sensor 80 coupled to device 54. Ideally, motion sensor 80 is an accelerometer, such as multi-axis MEMS accelerometer (for example part no. ADXL 202 available from Analog Devices, Inc., Wilmington, Mass.). Motion sensor 80 provides a motion signal corresponding to movement of device 54. As stated supra, processor 82 is uniquely configured to distinguish between tap commands (e.g., "enter") on device 54 and position commands (e.g., tilting) of device 54 and provides, in response to a tap command, one or more actions, and provides in response to position commands, one or more different actions to control and operate device 54.

In one design of this invention, motion-based input system 50 may include interface 84 which provides the interconnection between processor 82 and operating system 86 of the particular device 54. Typically, motion-based input system 50 includes controlling software 88 which controls and operates device 54 in response to commands issued by processor 82. Processor 82 may be a separate processor or a processor already associated with the electronic device.

In one preferred embodiment of this invention, controlling software 88 is programmed to display a small compass like icon on the screen with graphical elements such as arrows, to indicate the direction of the current position command (e.g., tilting). Tilt based position commands are performed by rotating device 54 to cause an angular deflection with respect to a reference orientation "neutral". When a tilt of a sufficient magnitude occurs the compass will show a graphical arrow in the direction of that tilt and will move the cursor, pointer, or equivalent software entity in the same direction. The rate of cursor motion may optionally be proportional to the angle of deflection. This example is typically referred to as a "continuous" input mode. If a tap command occurs while the device is tilted, the neutral reference orientation will be redefined to be the current orientation. If a tap command occurs while device 54 is in its neutral orientation, a select, enter, or equivalent software action will be performed.

In another example of this invention, called "stepped" input mode, the compass like icon on the screen will display the same graphical elements, such as arrows and the like, to indicate the direction of the proposed position command. In this example, a tilt motion of sufficient magnitude will cause the compass to show a graphical arrow in the direction of that tilt, but software 88 will not move the cursor or pointer until a tap command is performed while device 54 is tilted. If a tap command occurs while device 54 is tilted, software 88 moves the cursor. If a tap command occurs while device 54 is in neutral, software 88 performs a select or enter action. Optionally, a new neutral reference orientation may be set by tilting device 54 to the desired neutral orientation and not tapping it for a predetermined length of time. In one design of this invention, processor 82 is configured to select a continuous input mode or a stepped input mode depending on the active software application on device 54. Alternatively, in another design, as discussed below, software 88 may be programmed select a continuous input mode or a stepped input mode depending on the active software application on device 54.

Figure 5A:
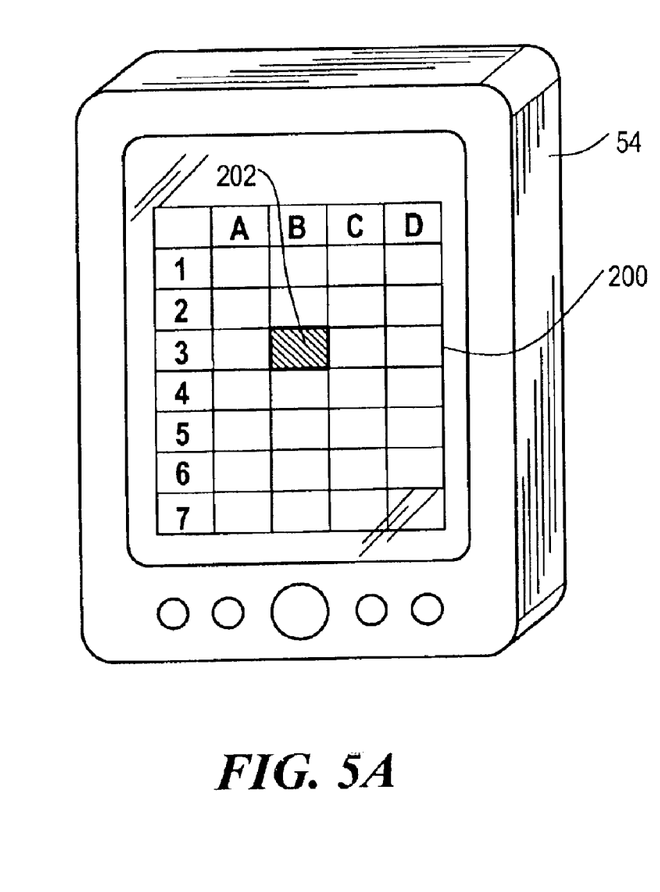
FIGS. 5A and 5B are schematic three-dimensional views of another example of the motion based input system in accordance with this invention employed in PDA.
Figure 5B:
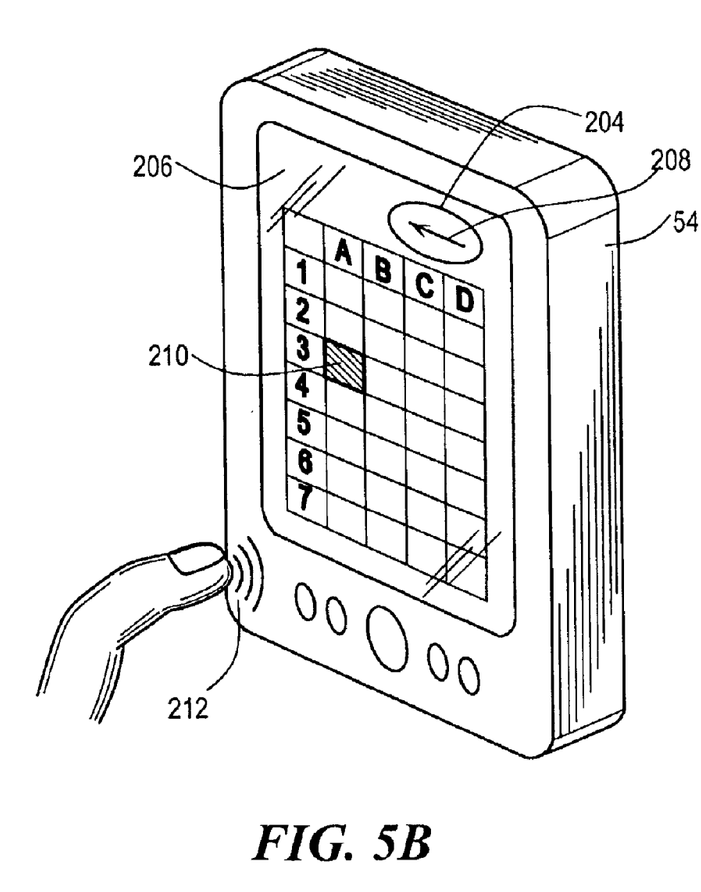

As an illustrative example of stepped input mode in accordance with this invention, if active program 200, FIG. 5A is an electronic spreadsheet and a user desires to move the active cell 202 from location B3 one cell to the left (cell A3), the position command of tilting device 54 to the left, as shown in FIG. 5B, causes controlling software 88 to display compass 204 on screen 206. Arrow 208 of compass 204 indicates the direction of the proposed movement of the active cell. A tap command as shown at 212 is detected by the motion sensor, and as discussed supra, processor 82 detects the tap command and provides, in response to the tap command, the action of moving the active cell to the left one cell, or to cell 210 at location A3. Similarly, though not shown, position commands, such as tilting electronic device to the right, down, or up will cause controlling software 88 to display compass 204 with arrow 208 pointing in the direction of the proposed movement which will be completed after the tap command is performed.

In another embodiment of this invention, controlling software 88 is programmed to detect the current application or program being used on device 54. Controlling software 88 is further uniquely programmed to determine the best motion-based input method for the application active on device 54. For example, if a flight simulator game is active on device 54, the best motion-based input system is the continuous mode. In this example, position commands (e.g., tilting) of the device provide the actions associated with controlling the simulated airplane and tap commands fire weapons. In another example, such as an electronic phone book, the stepped input mode, which uses a combination of tap commands and position commands, is the best motion-based input method to issue the appropriate actions of scrolling through the phone book.

Figure 6:
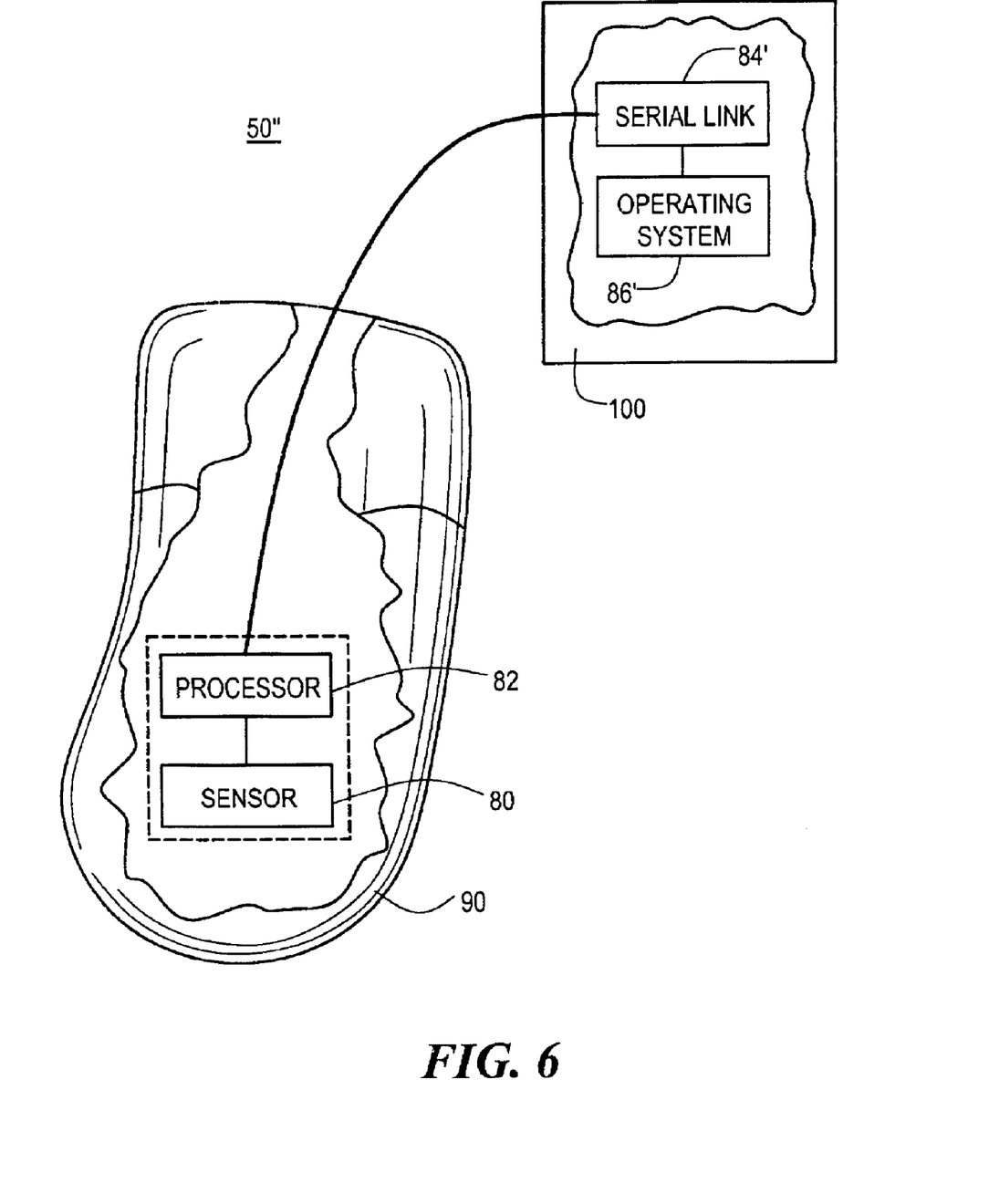
FIG. 6 is a partially broken away schematic view showing the primary components associated with the motion based input system of the subject invention when employed in a computer mouse.

In another example, motion-based input system 50", FIG. 6 of this invention is employed in buttonless computer mouse 90, where a tap on mouse 90 serves as the "click" button and movement of the mouse (i.e., position commands) serve as the "point". Motion sensor 80 provides a motion signal corresponding to movement of mouse 90 and processor 82 is responsive to the motion signal and configured to distinguish between a tap command on mouse 90 and a position command (e.g., movement) of mouse 90 and to provide, in response to a tap command, a click action and, in response to the position command, point actions to operate computer 100.

Motion-based input system 50" typically includes interface 84', such as a serial link, which is remotely located from motion sensor 80 and processor 82, and provides an interconnection between processor 82 and operating system 86' of computer 100. Although, in this example interface 84' is remotely located from mouse 90, in other examples interface 84' may be coupled within mouse 90. The result is a completely buttonless mouse which can be operated by simple tap commands and position commands of mouse 90, hence eliminating the need for any buttons which significantly extends the lifetime of mouse 90 and provides for simple operation of the mouse.

Figure 7:
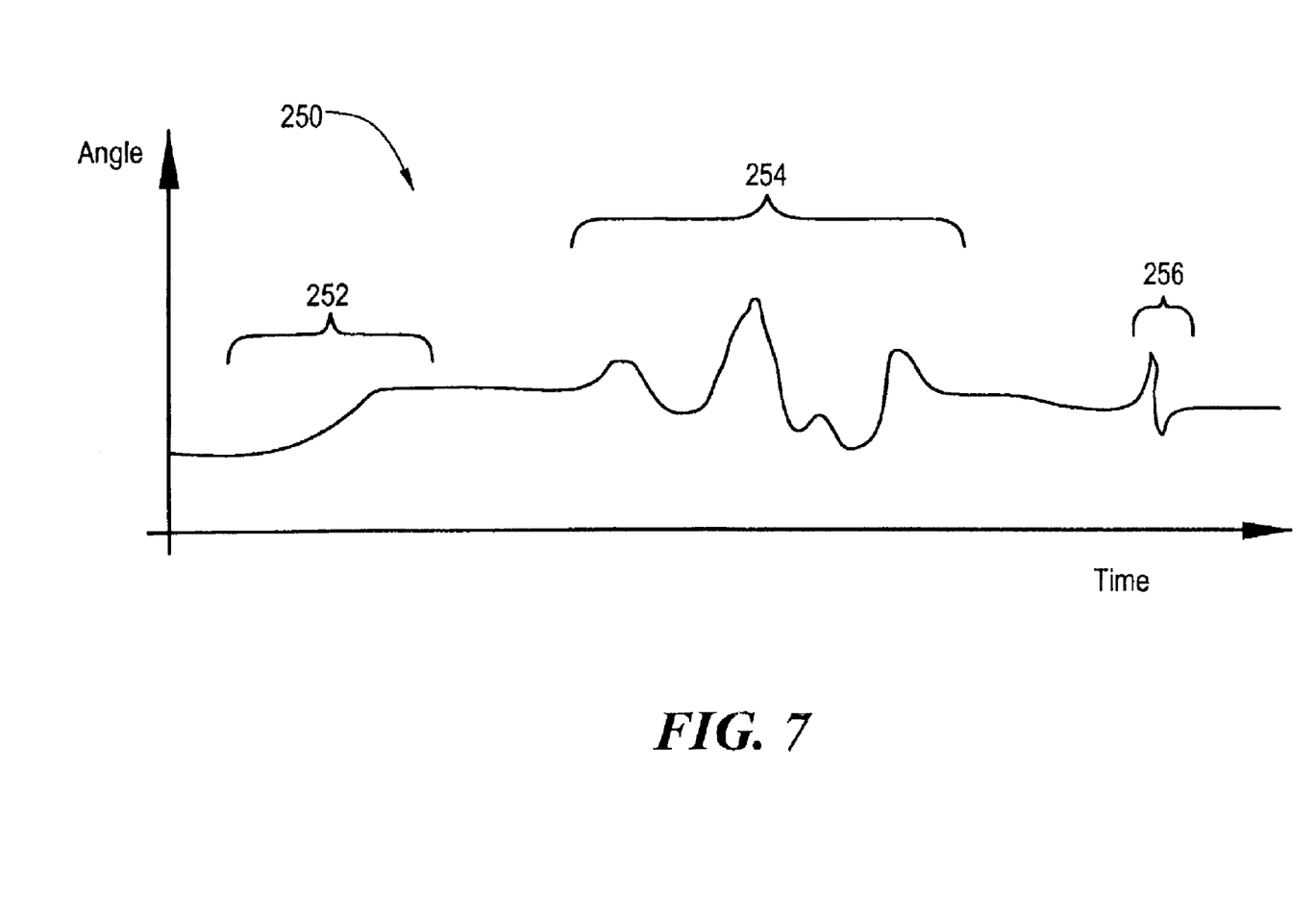
FIG. 7 is graph showing a waveform representing a tilt of a device, gesture motion of the device, and a tap on the device.
Figure 8A:
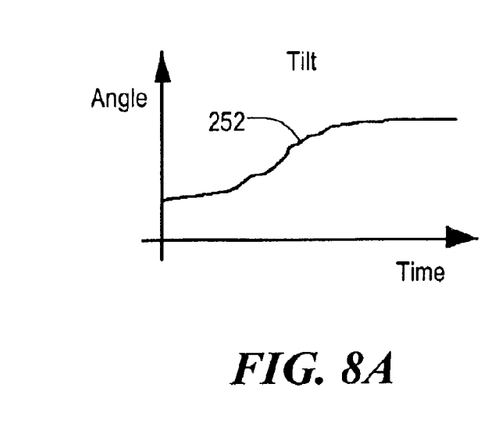
FIGS. 8A–8C are graphs showing in greater detail the waveforms for the motion events shown in FIG. 7.
Figure 8B:
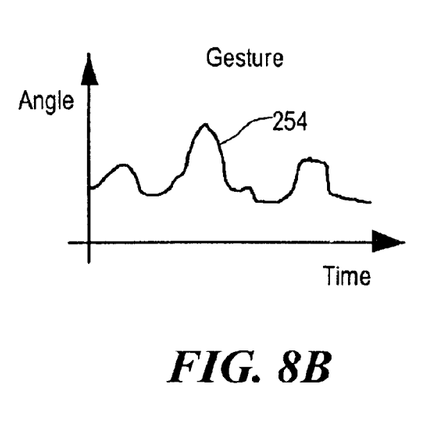

As shown in FIG. 7, graph 250 depicts three signals corresponding to motion input events or commands, e.g., a tilt, a gesture and a tap, which can be detected by a typical motion sensor. A tilt, as shown by section 252, is characterized as a change from one angular orientation to another. This type of motion or command produces a gradual shift of DC offset and generally has a low frequency content. A gesture motion command, as shown by section 254, is characterized as a dynamic and continuous changing signal over a period of time having a low to medium frequency content. A tap command, as shown by section 256, is an impulse type signal produced over a short period of time and has a high frequency content. Tap commands are also known as impulse commands because of the impulse nature of the motion caused by a tap command. Detailed views of the tilt, gesture and tap signals shown in FIG. 7 is shown in FIGS. 8A, 8B, and 8C, respectively.

Figure 8C:
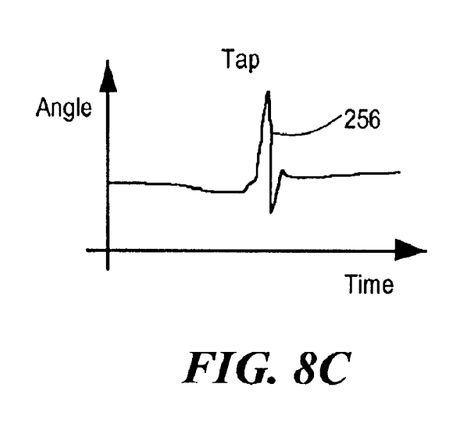

Ideally, in this invention, processor 80 detects a tap or impulse command, as shown at 256, FIGS. 7 and 8C by computing the power spectral density (PSD) of the motion signal and comparing the power level for a predetermined frequency range with a predetermined power level threshold. The PSD describes how the power (or variance) of a time series is distributed with frequency. It is defined, in mathematical terms, as the Fourier Transform of the autocorrelation sequence of the time series and it has units of power per unit of frequency. The computed PSD of the tap command signal shown by graph 256, FIG. 8C is shown as waveform 258, FIG. 9C. Similarly, the computed PSD of the tilt command signal shown by graph 252, FIG. 8A is shown by waveform 260, FIG. 9A. The computed PSD of gesture command signal shown by graph 254, FIG. 8B is shown by waveform 262, FIG. 9B.

Figure 9A:
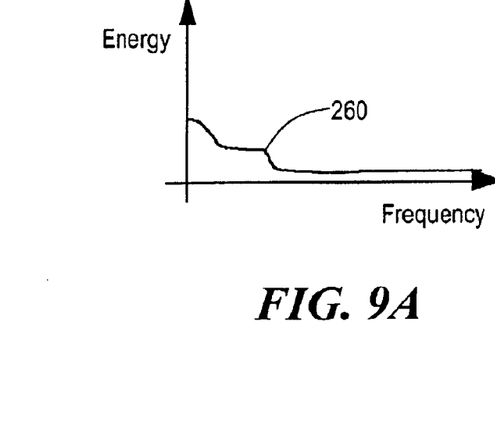
FIGS. 9A–9C are graphs showing frequency content in terms of spectral density for each motion event shown in FIGS. 8A–8C.
Figure 9B:
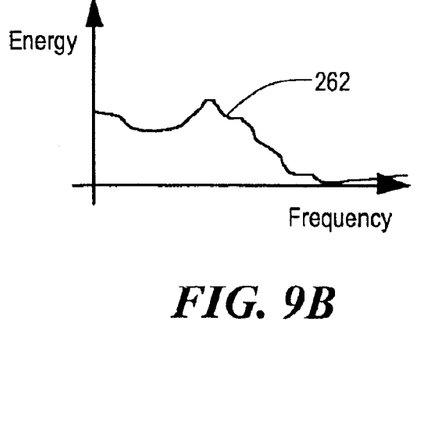
Figure 9C:
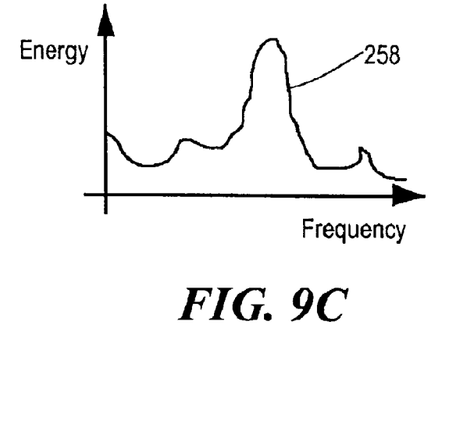

As can be seen by the computed PSD shown by waveform 258, FIG. 9C, a tap command has a significantly higher energy level and frequency content than the computed PSD for tilt command, as shown by waveform 260, FIG. 9A, and the computed PSD for a gesture command, as shown by waveform 262, FIG. 9B. Processor 80 of motion-based input system 50 of this invention is uniquely configured to detect the higher energy level and frequency from the computed PSD of a tap command as discussed above.

In one preferred embodiment, processor 80 is configured to detect predetermined threshold frequency greater than or equal to 5 Hz. In one example, the predetermined threshold levels are stored in a memory within processor 80, although the predetermined threshold levels may also be stored in an external memory. Ideally, the threshold levels detected by processor 80 are configurable to adjust the sensitivity of the tap detected by processor 56. This unique feature renders motion-based input system 50 able to distinguish between an inadvertent tap command on device 54 which is not intended to invoke any commands, and a tap which is intended to issue commands. Ideally, processor 82 also detects a tilt command (e.g., angular deflection) of device 54. In a preferred embodiment, processor 82 is a microprocessor which is programmed to distinguish between a tap command on device 54 and a position command of device 54.

Figure 10:
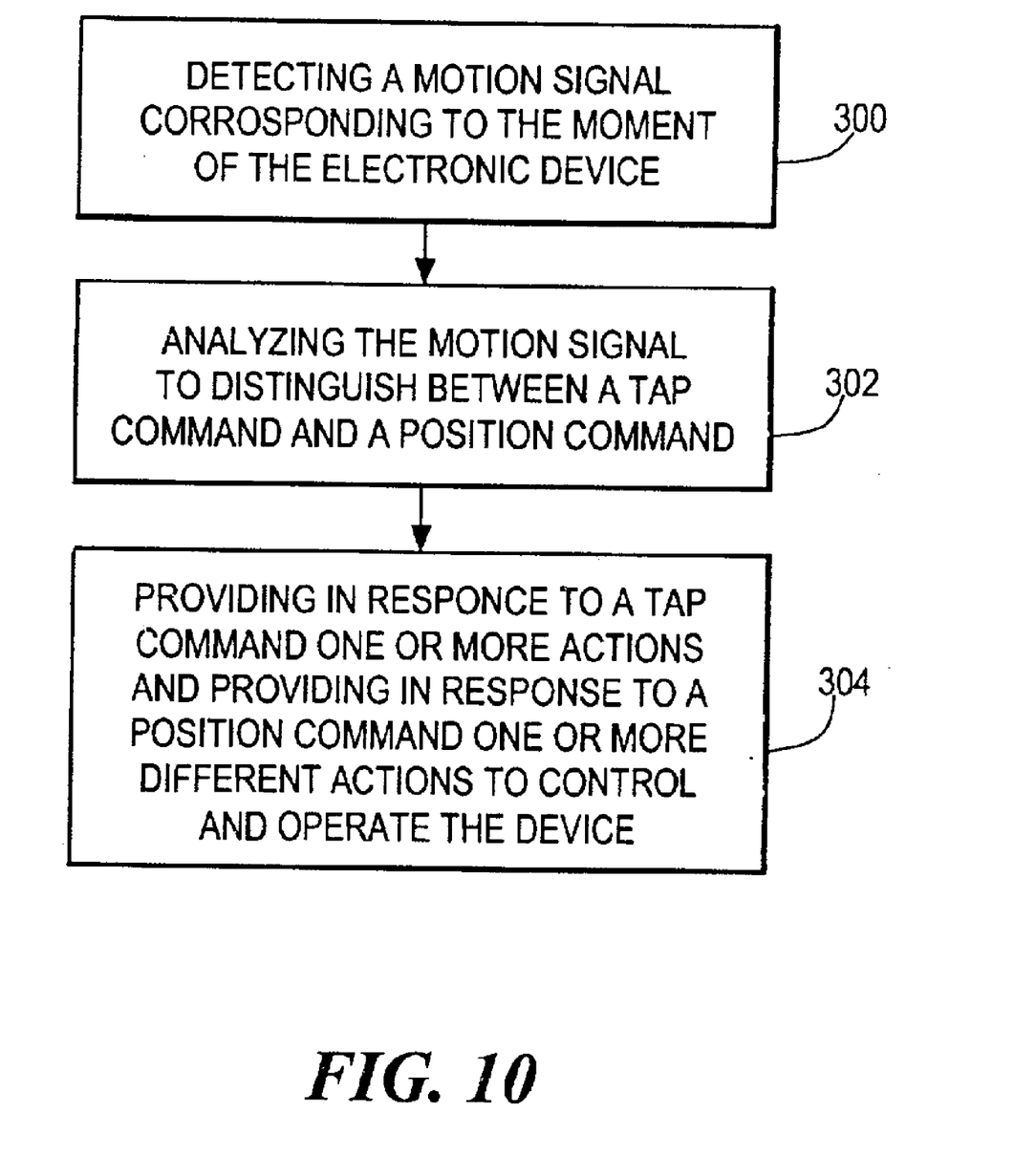
FIG. 10 is a flow chart of one embodiment of the motion-based method for processing commands for an electronic device in accordance with the present invention.

In accordance with the method of this invention, input commands are processed for a device, which includes the steps of detecting a motion signal corresponding to movement of the device, step 300, FIG. 10; analyzing the motion signal to distinguish between a tap command and a position command, step 302; and providing, in response to the tap command, one or more actions and providing, in response to a position command, one or more different actions, step 304, to control and operate the device. Typically, a tap is associated with an action such as "enter" but different series of taps may be associated with, in a memory, for example, with a number of different actions as explained above with reference to FIG. 3. Also, different motions are associated, also perhaps in a memory, with different position commands. For example a tilt to the right means move the cursor to the right and the like. See also co-pending application Ser. No. 09/773,165 filed Jan. 31, 2001 incorporated herein by this reference.

The robust motion-based input system of this invention is uniquely designed to detect tap commands and further designed to distinguish between tap commands on an electronic device and position commands of the electronic device. The robust design not only distinguishes between tap commands and position commands, but also provides one or more actions in response to the tap commands, and one or more different actions in response to the position commands. This unique feature provides the ability to perform a vast combination of actions based on a simple tap, or a combination of taps and/or position commands. The ability to detect a tap and perform one or more actions eliminates the need to perform the complex gesture commands of the prior art, which are often difficult and/or impossible to perform by persons of limited hand dexterity. The system of this invention is simple and easy to operate and can even be applied to mouse-technology to provide for a completely buttonless mouse which does not need to be lifted or require elaborate motions to invoke certain commands. Moreover, there is no need to configure the system by performing elaborate gesture commands which must be stored in a database, or memorizing the patterns of movement associated with the gesture commands. Moreover, enter keys and buttons can be eliminated in any electronic device.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A motion-based input system comprising:
    a motion sensor coupled to a device, the motion sensor providing a motion signal corresponding to the movement of the device; and
    a processor responsive to the motion signal and configured to: distinguish between a tap command and a position command and to provide, in response to a tap command, one or more actions, and in response to a position command, one or more different actions to control and operate the device, wherein the processor detects a tap command by computing the power spectral density of the motion signal and comparing the energy level of the computed power spectral density of the motion signal with a predetermined threshold energy level for a predetermined threshold frequency range.

2. The motion-based input system of claim 1 in which the predetermined threshold levels are configured to adjust the sensitivity or the tap detected by the processor.

3. The motion-based input system of claim 2 in which the predetermined threshold frequency detected by the processor is greater than or equal to 5 Hz.

4. The motion-based input system of claim 1 in which the predetermined threshold levels are stored in a memory.

5. The motion-based input system of claim 1 in which the processor is a microprocessor.

6. The motion-based input system of claim 1 further including an interface between the processor and an operating system resident on the device.

7. The motion-based input system of claim 6 further including controlling software to control end operate the device based on the processor actions.

8. The motion-based input system of claim 7 in which the controlling software is programmed to display a graphical representation which indicates the direction of a current or a proposed position command.

9. The motion-based input system of claim 8 in which a continuous input mode provides continuous cursor or pointer movement in the direction of the current position command.

10. The motion-based input system of claim 9 in which the rate of cursor or pointer movement provided by the continuous input mode is proportional to the magnitude of the position command.

11. The motion-based input system of claim 10 in which the controlling software is programmed to display a graphical representation to indicate the direction of the continuous cursor or pointer movement.

12. The motion-based input system of claim 8 in which a stepped input mode indicates the direction of a proposed position command and moves the cursor or pointer in the direction of the proposed position command in response to a tap command.

13. The motion-based input system of claim 12 in which the controlling software is programmed to display a graphical representation to indicate the direction of the proposed position command.

14. The motion-based input system of claim 8 in which the processor is configured to select a continuous input mode or a stepped input mode depending on an active software application.

15. The motion-based input system of claim 1 in which the motion sensor is an accelerometer.

16. The motion-based input system of claim 1 in which the device is an electronic device.

17. A motion-based input system comprising:
- a motion sensor coupled to a device, the motion sensor providing a motion signal corresponding to the movement of the device; and
- a processor, responsive to the motion signal and configured to: detect a tap command; and provide, in response to the tap command, one or more actions to operate and control the device, wherein the processor detects a tap command by computing the power spectral density of the motion signal and comparing the energy level of the computed power spectral density of the motion signal with a predetermined threshold energy level for a predetermined threshold frequency range.

18. The motion-based input system of claim 17 in which the predetermined threshold frequency detected by the processor is greater than or equal to 5 Hz.

* * * * *